(12) United States Patent
Wang et al.

(10) Patent No.: US 12,387,237 B2
(45) Date of Patent: Aug. 12, 2025

(54) DISPLAY DEVICE, CONTAINER SYSTEM, AND METHOD FOR CONTROLLING DISPLAY DEVICE

(71) Applicants: Beijing BOE Display Technology Co., Ltd., Beijing (CN); BOE Technology Group Co., Ltd., Beijing (CN)

(72) Inventors: Xinrui Wang, Beijing (CN); Jixing Sun, Beijing (CN); Zhuang Xu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/563,911

(22) PCT Filed: Oct. 22, 2021

(86) PCT No.: PCT/CN2021/125844
§ 371 (c)(1),
(2) Date: Nov. 23, 2023

(87) PCT Pub. No.: WO2022/247123
PCT Pub. Date: Dec. 1, 2022

(65) Prior Publication Data
US 2024/0257178 A1    Aug. 1, 2024

(30) Foreign Application Priority Data
May 26, 2021    (CN) .......................... 202110575756.9

(51) Int. Cl.
*G06Q 30/02*        (2023.01)
*F25D 29/00*        (2006.01)
(Continued)

(52) U.S. Cl.
CPC ....... *G06Q 30/0251* (2013.01); *F25D 29/005* (2013.01); *G06V 40/20* (2022.01);
(Continued)

(58) Field of Classification Search
CPC .. G06Q 30/02; G06Q 30/0251; F25D 29/005; G06V 40/20; G09F 9/30; G09F 23/06;
(Continued)

(56) References Cited

U.S. PATENT DOCUMENTS

2013/0181894 A1* 7/2013 Xu ........................... G06F 3/013
345/156
2017/0372679 A1* 12/2017 Ye ........................... G06F 3/147

FOREIGN PATENT DOCUMENTS

CN        102081810 A    6/2011
CN        103679861 A    3/2014
(Continued)

OTHER PUBLICATIONS

International Search Report for PCT/CN2021/125844 Mailed Feb. 24, 2022.
(Continued)

*Primary Examiner* — Afaf Osman Bilal Ahmed
(74) *Attorney, Agent, or Firm* — Ling Wu; Stephen Yang; Ling and Yang Intellectual Property

(57) ABSTRACT

A display device (1), a container system, and a method for controlling the display device (1) are provided. The display device (1) includes: a display screen (10) including a display surface (101) and a back surface (102) opposite to the display surface (101); a depth camera component (11) configured to obtain image information in front of the display screen (10) in real time, the image information including distance information between a user and the display screen; and a processing component (12) electrically connected to the depth camera component (11) and config-
(Continued)

ured to control switching of display content and/or format of the display screen (10) according to the distance information between the user and the display screen (10) determined by means of the obtained image information.

16 Claims, 16 Drawing Sheets

(51) Int. Cl.
    *G06Q 30/0251*     (2023.01)
    *G06V 40/20*     (2022.01)
    *G09F 9/30*     (2006.01)
    *G09F 23/06*     (2006.01)
    *G10L 15/22*     (2006.01)
    *H04N 23/57*     (2023.01)
    *H04N 23/90*     (2023.01)
    *H04R 1/02*     (2006.01)

(52) U.S. Cl.
    CPC ............... *G09F 9/30* (2013.01); *G09F 23/06* (2013.01); *G10L 15/22* (2013.01); *H04N 23/57* (2023.01); *H04N 23/90* (2023.01); *H04R 1/028* (2013.01); *H04R 2499/15* (2013.01)

(58) Field of Classification Search
    CPC ....... G09F 27/00; G09F 27/005; G10L 15/22; H04N 23/57; H04N 23/90; H04R 1/028; H04R 2201/02; A47F 3/043; G06F 3/0484

USPC .......................................... 705/14.01, 14.02
    See application file for complete search history.

(56) References Cited

FOREIGN PATENT DOCUMENTS

| | | |
|---|---|---|
| CN | 104865965 A | 8/2015 |
| CN | 204695100 U | 10/2015 |
| CN | 108228032 A | 6/2018 |
| CN | 108271078 A | 7/2018 |
| CN | 109814516 A | 5/2019 |
| CN | 110139154 A | 8/2019 |
| CN | 111198638 A | 5/2020 |
| CN | 112558752 A | 3/2021 |
| CN | 112560785 A | 3/2021 |
| CN | 215895932 U | 2/2022 |
| JP | H11232537 A | 8/1999 |
| JP | 2004286872 A | 10/2004 |
| JP | 2005301668 A | 10/2005 |
| KR | 20120074484 A | 7/2012 |

OTHER PUBLICATIONS

Office Action dated Aug. 19, 2024 for Chinese Patent Application No. 202110575756.9 and English Translation.

\* cited by examiner

DISPLAY DEVICE, CONTAINER SYSTEM, AND METHOD FOR CONTROLLING DISPLAY DEVICE

CROSS-REFERENCE TO RELATED APPLICATION

The present application is a U.S. National Phase Entry of International Application No. PCT/CN2021/125844 having an international filing date of Oct. 22, 2021, which claims priority to a Chinese Patent Application No. 202110575756.9, filed to the CHIPA on May 26, 2021, and entitled "Display Device, Container System, and Method for Controlling of Display Device". The above-identified applications are hereby incorporated by reference.

TECHNICAL FIELD

The disclosure relates to the technical field of semiconductors, in particular to a display device, a container system and a control method for the display device.

BACKGROUND

At present, there is an increasing demand for display screens to replace traditional goods introduction labels and glass cabinet doors in large supermarkets and other environments. In the process of goods display and sales, there are demands for goods monitoring, human-computer interaction and goods introduction in self-service.

SUMMARY

The present disclosure provides a display device, a container system and a control method for the display device. The display device includes: a display screen including a display surface and a back surface opposite to the display surface; a depth photographing component configured to acquire image information in front of the display screen in real time, wherein the image information contains distance information between a user and the display screen; and a processing component electrically connected to the depth photographing component and configured to control display contents and/or formats switching of the display screen according to distance information between a user and the display screen determined by the acquired image information.

In one possible implementation, the processing component is specifically configured to: control the display screen to display different advertisement images sequentially when a distance between the user and the display screen is determined to be greater than a first distance value; and control the display screen to display a first display image including commodity information in the container and prompting the selection of the goods information when a distance between user and the display screen is determined to be less than the first distance value.

In one possible implementation, the display device further includes a microphone component and a photoelectric sensing component; the photoelectric sensing component is configured to sense human body action information in real time; the microphone component is configured to receive voice information of a user when receiving a first instruction; and the processing component is further configured to, when the human body action information sensed by the photoelectric sensing component is acquired, send the first instruction to the microphone component, acquire voice information of the microphone, and control the display screen to display a second display image including an goods information introduction corresponding to the voice information.

In one possible implementation, the processing component is further configured to count the number of viewers and the duration of stay during a display period of a corresponding advertising image when the distance between the user and the display screen is determined to be greater than the first distance value and less than the second distance value.

In one possible implementation, the processing component is specifically configured to: read the number of human body contours whose distance from the display screen is larger than the first distance value and smaller than the second distance value before the display period of the current advertisement image; increase the number of human body contours by one when the human body contour is determined to be moved into a range of the second distance value during a display period of the current advertisement image; and reduce the number of human body contours by one when the human body contour is determined to be moved out of a range of the second distance value during a display period of the current advertisement image.

In one possible implementation, a first photographing component is further included, and the first photographing component is configured to acquire user image information in real time.

In one possible implementation, an assembly support frame fixed on a side of the display screen is further included, wherein an extension direction of a main body of the assembly support frame is the same as that of a side edge fixed on the display screen, and the assembly support frame has a first through groove, a second through groove and a third through groove arranged sequentially along the extension direction of the main body of the assembly support frame;

The first photographing component is embedded in the first through groove to be fixed with the display screen; the photoelectric sensing component is embedded in the second through groove to be fixed with the display screen; and the microphone component is embedded in the third through groove to be fixed with the display screen.

In one possible implementation, the photoelectric sensing component has a plurality of first lugs on a side away from the display surface, and the microphone component has a plurality of second lugs on a side away from the display surface; the assembly support frame has a plurality of first grooves on a side away from the display surface, the assembly support frame has a plurality of second grooves on a side away from the display surface, and the first lugs are embedded in the first grooves one by one to limit the photoelectric sensing component; and the second lugs are embedded in the second grooves one by one to limit the microphone component.

In one possible implementation, a protective cover plate located on a side of the assembly support frame facing away from the display surface, and a buffer double-sided thermal conductive adhesive located between the assembly support frame and the protective cover plate are also included, wherein the protective cover plate and the buffer double-sided thermal conductive adhesive are fixed to the assembly support frame through an assembly component.

In one possible implementation, a first photographing cover plate covering a photographing surface of the first photographing component, and a first photographing double-sided buffer adhesive located between the first photographing component and the first photographing cover plate are included, wherein the first photographing double-sided buffer adhesive has a hollow in an region corresponding to the first photographing component.

In one possible implementation, the display screen is used for being arranged on a door body or directly acting as the door body; the display device includes at least one second photographing component arranged on the back surface and a first sensor; The first sensor is configured to detect an opening angle of the display screen relative to the door body of the container in real time; the second photographing component is configured to photograph the goods in the container when a photographing instruction is received; the processing component is further configured to acquire an opening angle of the door body of the first sensor, and send the photographing instruction to the second photographing component when the opening angle of the door body is determined to be a first angle.

In one possible implementation, an included angle between a photographing surface of the second photographing component and the back surface is 130°~150°.

In one possible implementation, a second sensor arranged on the back surface is further included, and the second sensor is configured to monitor a temperature and/or a humidity within the container in real time.

In one possible implementation, a fixation component is further included, and the fixation component is configured to fix the display device to the container pivotally.

An embodiment of the present disclosure further provides a container system, which includes the display device provided by an embodiment of the present disclosure.

An embodiment of the disclosure further provides a control method for the display device as provided by an embodiment of the disclosure, including: acquiring image information in front of the display screen in real time; and control display contents and/or formats switching of the display screen according to distance information between a user and the display screen determined by the acquired image information.

In one possible implementation, the control of the display contents and/or formats switching of the display screen according to the acquired image information includes: determining a distance between the user and the display screen according to the acquired image information; controlling the display screen to display different advertisement images sequentially when the distance is determined to be greater than the first distance value; and control the display screen to display a first display image including commodity information in the container and prompting the selection of the goods information when the distance is determined to be less than the first distance value.

In one possible implementation, after controlling the display screen to display the first display image including the commodity information in the container and prompting selection of the goods information, the control method further includes: sensing human body action information in real time; acquiring voice information of the user when it is determined that the human body action information is acquired; and controlling, according to the voice information, the display screen to display a second display image including a goods information introduction corresponding to the voice information.

In one possible implementation, the control of the display contents and/or formats switching of the display screen according to the acquired image information further includes: counting the number of viewers and duration of stay during a display period of a corresponding advertising image when the distance between the user and the display screen is determined to be greater than the first distance value and less than the second distance value.

In one possible implementation, the counting of the number of viewers and the duration of stay in a display period of a corresponding advertising image includes: reading the number of human body contours in a range of a distance from the display screen which is larger than the first distance value and smaller than the second distance value before a display period of the current advertisement image; increasing the number of human body contours by one when the human body contour is determined to be moved into a range of the second distance value during the display period of the current advertisement image; and reducing the number of human body contours by one when the human body contour is determined to be moved out of a range of the second distance value during the display period of the current advertisement image.

DETAILED DESCRIPTION

In order to make objectives, technical solutions and advantages of the embodiments of the present disclosure more clear, the technical solutions of the embodiments of the present disclosure will be clearly and completely described below with reference to the drawings of the embodiments of the present disclosure. Apparently, the described embodiments are a part of the embodiments of the present disclosure, not all of the embodiments. Based on the described embodiments of the present disclosure, all other embodiments obtained by those of ordinary skills in the art without inventive effort are within the protection scope of the present disclosure.

Unless otherwise defined, technical terms or scientific terms used in the present disclosure should have the meanings as commonly understood by those of ordinary skill in the art that the present disclosure belongs to. The "first", "second" and similar terms used in the present disclosure do not indicate any order, quantity, or importance, but are used only for distinguishing different components. "Include", "contain", or similar words mean that elements or objects appearing before the words cover elements or objects listed after the words and their equivalents, but do not exclude other elements or objects. "Connect", "join", or a similar term is not limited to a physical or mechanical connection, but may include an electrical connection, whether direct or indirect. "Upper", "lower", "left", "right", etc., are used to represent relative position relations, and when an absolute position of a described object is changed, the relative position relation may also be correspondingly changed.

In order to keep the following description of the embodiments of the present disclosure clear and concise, detailed descriptions of known functions and known components are omitted in the present disclosure.

Figure 1:
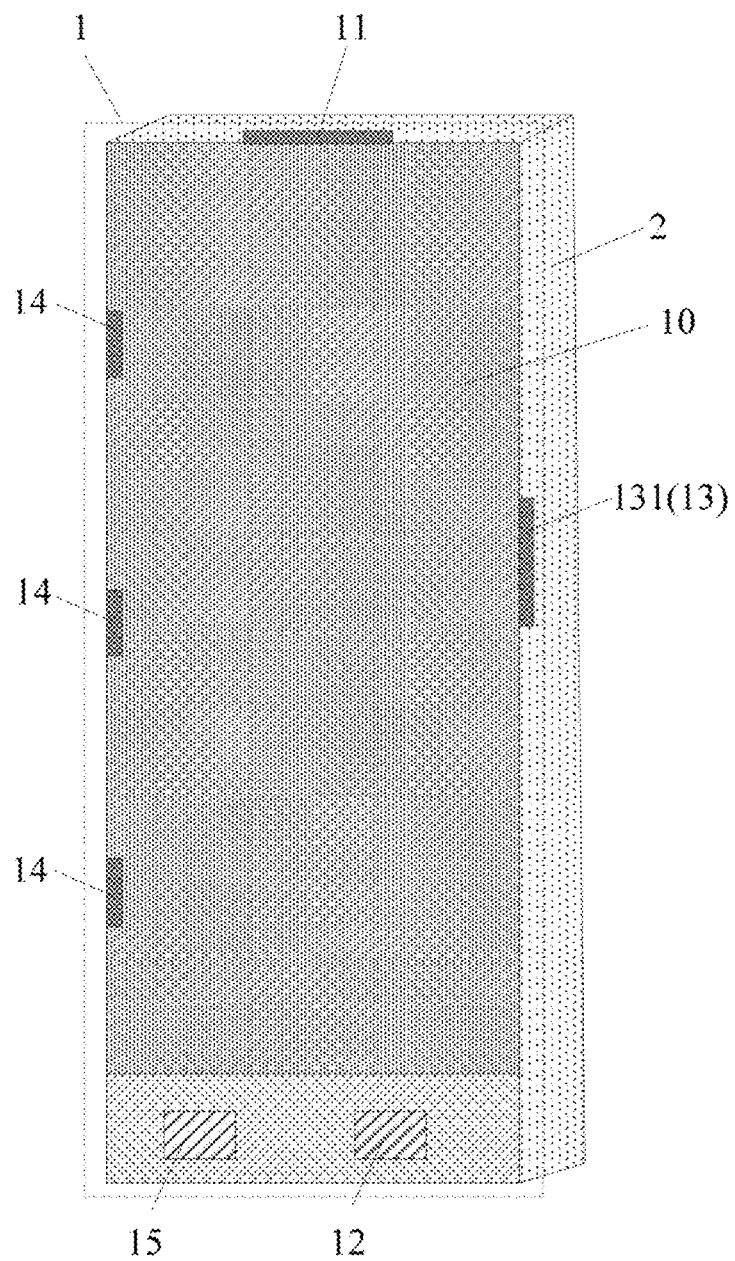
FIG. 1 is a first schematic diagram of a structure of a display device according to an embodiment of the present disclosure.
Figure 2:
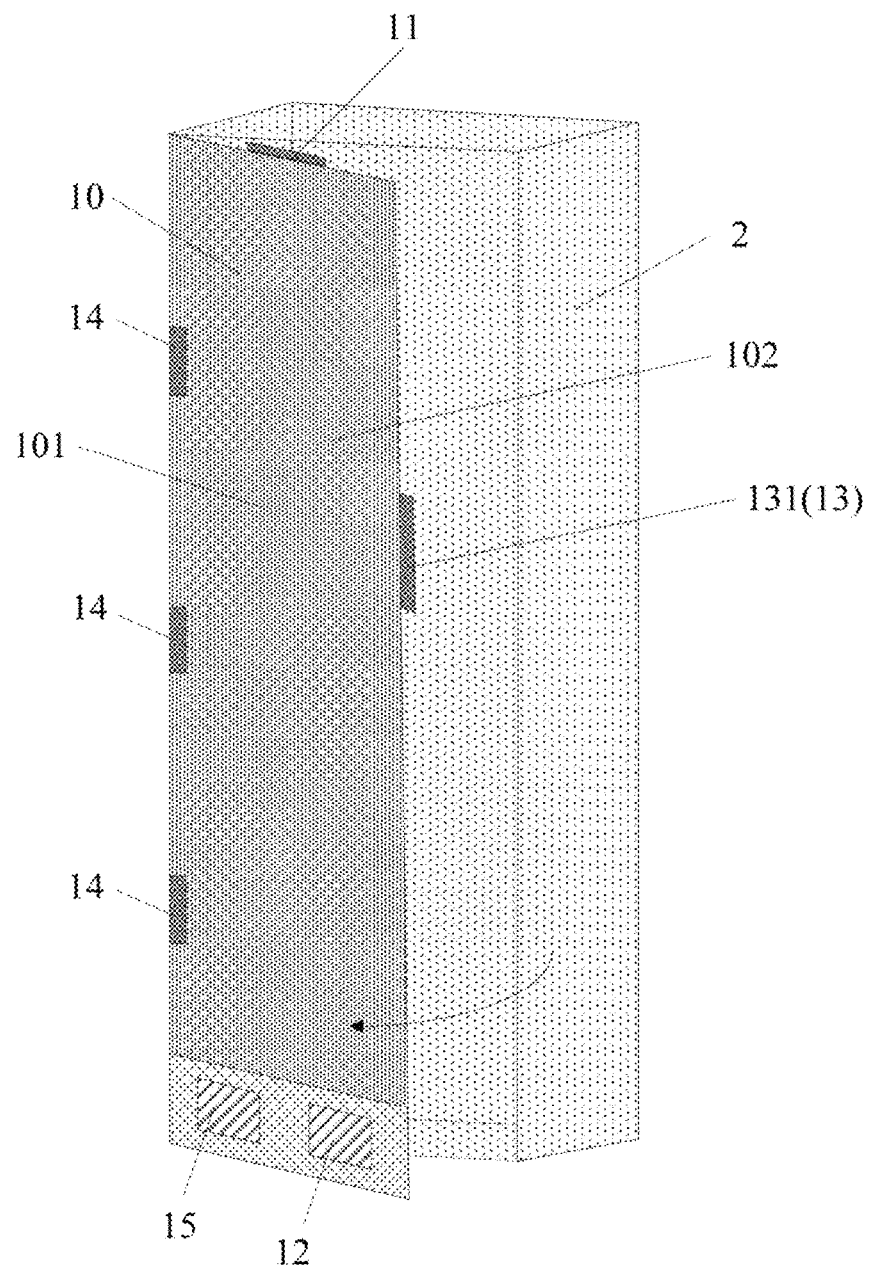
FIG. 2 is a second schematic diagram of a structure of a display device according to an embodiment of the present disclosure.

Referring to FIG. 1 and FIG. 2, an embodiment of the present disclosure provides a display device 1, which may be applied to freezers and containers in large shopping malls and supermarkets, installed at the front end of the freezers and containers and used as a door of the freezers and containers, the display device 1 includes: a display screen 10 including a display surface 101 and a back surface 102 opposite to the display surface 101, the display screen 10 may be provided on a door body or directly as the door body; a depth photographing component 11 configured to acquire image information in front of the display screen 10 in real time, wherein the image information contains distance information between a user and the display screen 10; and a processing component 12 electrically connected to the depth photographing component 11 and configured to control display contents and/or formats switching of the display screen 10 according to the distance information between a user and the display screen determined by the acquired image information.

In an embodiment of the present disclosure, the display device includes a display screen 10, a depth photographing component 11, and a processing component 12, wherein the depth photographing component may acquire image information in front of the display screen 10 in real time, the processing component 12 may control the display contents and/or formats switching of the display screen 10 according to the distance information between the user and the display screen determined by the acquired image information, and may make the display screen display corresponding pictures in real time according to an interaction between the user and the display screen, so as to achieve an interaction between the user and the display screen.

Figure 3A:
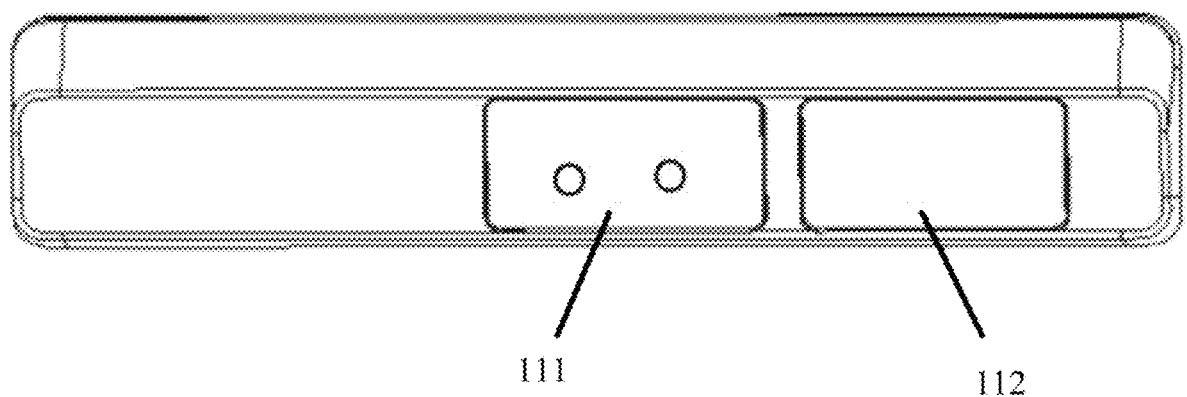
FIG. 3A is a schematic diagram of a structure of a depth photographing component according to an embodiment of the present disclosure.

In a specific implementation, as shown in conjunction with FIG. 3A, the depth photographing component 11 may specifically be a depth camera such as a Time of Flight (TOF), which may specifically include an infrared emitter 111 and an infrared receiver 112, and its working principle is that the infrared emitter 111 emits a light pulse, the light pulse is reflected when encountering an obstacle, and the infrared receiver 112 receives the reflected light pulse and calculates a distance from the object to the depth camera by recording the round trip time of the light.

In one possible implementation, the processing component 12 is specifically configured to: control the display screen 10 to display different advertisement images sequentially when a distance between the user and the display screen 10 is determined to be greater than a first distance value; and control the display screen 10 to display a first display image including information on goods in the container and prompting selection of the goods information when a distance between the user and the display screen 10 is determined to be less than the first distance value. In this way, when the user is close to the display screen, the user may interact with the display screen 10, and when the user is away from the display screen 10, the display screen 10 may display advertisement images, thereby enhancing the attractiveness of the goods for the users and achieving the multifunction of the display screen 10.

In one possible implementation, the processing component 13 is further configured to count the number of viewers and the duration of stay of the viewers during a display period of a corresponding advertising image, when the distance between the user and the display screen is determined to be greater than the first distance value and less than the second distance value. In this way, counting a human traffic in the advertising region, evaluating an influence after advertising, evaluating an attractiveness of advertising contents, and analyzing customer preferences may be achieved.

Specifically, the processing component 13 is specifically configured to: read the number of human body contours within a range where a distance between the human body contours and the display screen 10 is larger than the first distance value and smaller than the second distance value before the display period of the current advertisement image; increase the number of human body contours by one when the human body contour is determined to be moved into a range of the second distance value during a display period of the current advertisement image; and reduce the number of human body contours by one when the human body contour is determined to be moved out of a range of the second distance value during a display period of the current advertisement image. In this way, it is achieved that the number of viewers in a display period of the corresponding advertisement image is counted.

Specifically, individual timing starts when each person enters a counting region (a range within the second distance value), and the timing ends when the human body leaves the counting region. When the data is transmitted to the processing component 13, the data is stored, and the attractiveness of the advertisement contents is evaluated so as to analyze the customer preference.

In one possible implementation, as shown in FIGS. 1, 2, 3B and 4A, the display device 1 further includes an interactive assembly 13, which may include a microphone component 131 and a photoelectric sensing component 132; the photoelectric sensing component 132 is configured to sense human body action information in real time; specifically the human body action information may be for example a hand-waving action of the human body and the photoelectric sensing component 132 determines whether or not the user has a related action in front of the photoelectric sensing component 132 through a light brightness difference sensed at the time of waving and not waving; the microphone component 131 is configured to receive voice information of a user when receiving a first instruction; and when the human body motion information sensed by the photoelectric sensing component 132 is acquired, the processing component 12 is further configured to send the first instruction to the microphone component 131, acquire the voice information of the microphone 131, and control the display screen 10 to display a second display image including a goods information introduction corresponding to the voice information.

In an embodiment of the present disclosure, a microphone component 13 is further included, which may achieve an acquisition of voice information of a user to make the display screen 10 display relevant images corresponding to the voice information according to the acquired voice information, so as to achieve an interaction between the display screen and the user, and the photoelectric sensing component 132 may sense the action of the user and make the microphone component 131 be turned on when the human body action is sensed, so as to avoid the problems of inaccurate received information and large power consumption when the microphone component 131 is always turned on.

Figure 3B:
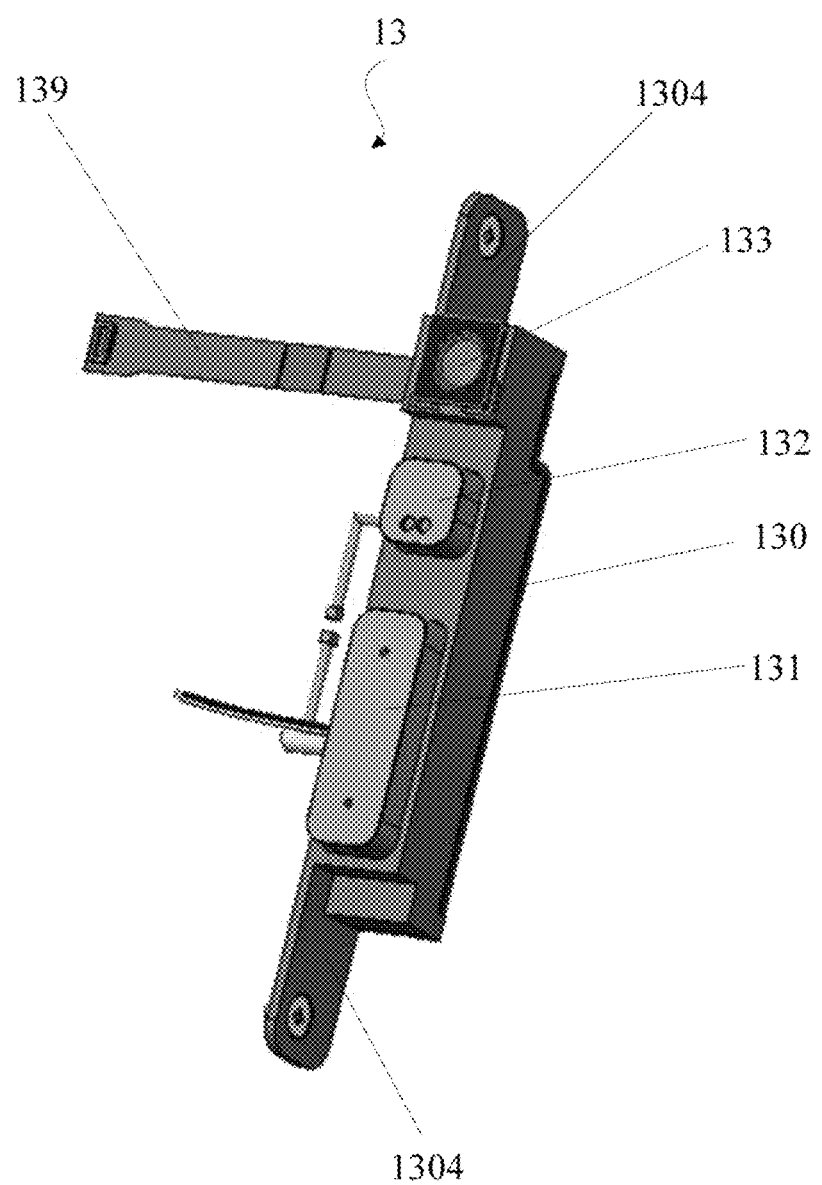
FIG. 3B is a first schematic diagram of a structure of an interaction assembly according to an embodiment of the present disclosure.

In one possible implementation, as shown in FIG. 3B, the interaction assembly 13 may further include a first photographing component 133, which may specifically act as a front camera and is configured to acquire user image information in real time, and the processing component is further configured to acquire user image information. In the embodiment of the present disclosure, the interactive assembly 13 may include a first photographing component 133, which may photograph a picture in front of the container and monitor the contents of the picture.

It can be understood that in an embodiment of the present disclosure, the depth photographing component 11 mainly reads depths of the photographed object, and may count the information of the number, distance and duration of the human body contour; specifically, the image information photographed by the depth photographing component 11 may be without picture detail colors and user face information, so that there may be a reduced data amount, the cost of the depth photographing component 11 is reduced, and the privacy related to the user face information may be protected; the first photographing component 133 may photograph the picture in front of the container and monitor the picture content to be as a backup, part of the scene may be a scene picture monitored from the background; and the function of the display device 1 is supplemented because the depth photographing component member 11 has no picture detail color and user face information.

In one possible implementation, as shown in FIG. 1, FIG. 2, FIG. 3B and FIG. 4A, the interactive assembly 13 further includes: an assembly support frame 130 fixed to a side of the display screen 10, wherein a main body extension direction of the assembly support frame 130 is the same as a side edge extension direction fixed to the display screen 10, and the assembly support frame 130 includes a first through groove 1303, a second through groove 1302, and a third through groove 1301 arranged sequentially along the main body extension direction of the assembly support frame 130; specifically, for example, as shown in FIG. 1, when the assembly support frame 130 is fixed to the right side of the display screen 10, the main body extension direction of the assembly support frame 13 is the same as that of the right side edge of the display screen 10, and the first through groove 1303, the second through groove 1302, and the third through groove 1301 are arranged sequentially along the extension direction parallel to the right side edge of the display screen 10; the first photographing component 133 is fixed to the display screen 10 by being embedded in the first through groove 1303; the photoelectric sensing component 132 is fixed to the display screen 10 by being embedded in the second through groove 1302; and the microphone component 131 is fixed to the display screen 10 by being embedded in the third through groove 1301. In the embodiment of the present disclosure, the display device further includes an assembly support frame 130, which includes a first through groove 1303, a second through groove 1302 and a third through groove 1301 arranged sequentially to achieve the fixing of the first photographing component 131, a photoelectric sensing component 132, a microphone component 131 to the display screen 10; and moreover, the photoelectric sensing component 132 is a sensing control switch of the microphone component 131, and when using the microphone component 131, it is needed to wave in front of the photoelectric sensing component 132, so the photoelectric sensing component 132 and the microphone component 131 are assembled integrally at a close distance, with closely arranged positions, which is convenient for the correlation control between the two, and the assembly support frame 130 is fixed at a position above the middle of an edge door opening side of the display screen 10, which is ergonomic and convenient for a person to easily see and reach for operation.

Figure 5:
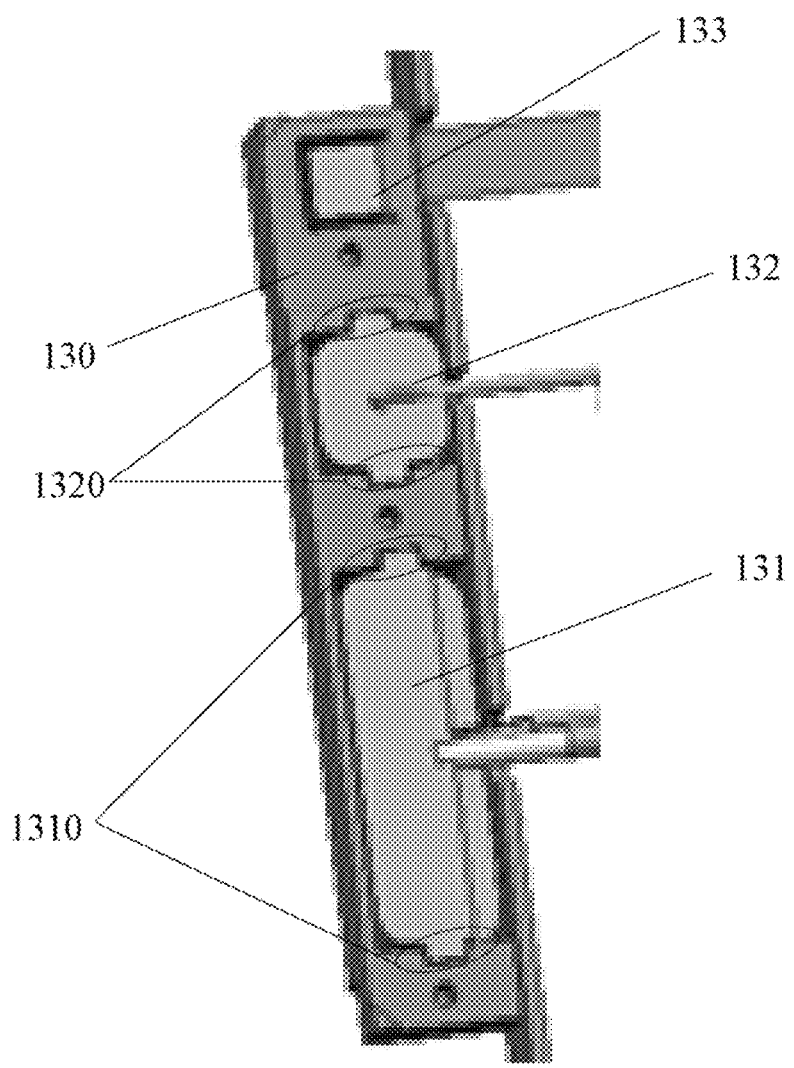
FIG. 5 is a schematic diagram of a structure of a back surface of a display screen according to an embodiment of the present disclosure.

In one possible implementation, as shown in FIG. 5, it is a schematic diagram of a back side of an interactive assembly 13, wherein the photoelectric sensing component 132 has a plurality of first lugs 1320 on a side away from the display surface 101, and the microphone component 131 has a plurality of second lugs 1310 on a side away from the display surface 101; the assembly support frame 130 has a plurality of first grooves on a side away from the display surface 101, and a plurality of second grooves on a side away from the display surface 101, and the first lugs 1320 are embedded in the first grooves one by one to limit the photoelectric sensing component 132; and the second lugs 1310 are embedded in the second grooves one by one to limit the microphone component 131, so that the movement of the photoelectric sensing component 132 and the microphone component 131 in a direction perpendicular to the display surface 101 may be restricted.

Figure 4A:
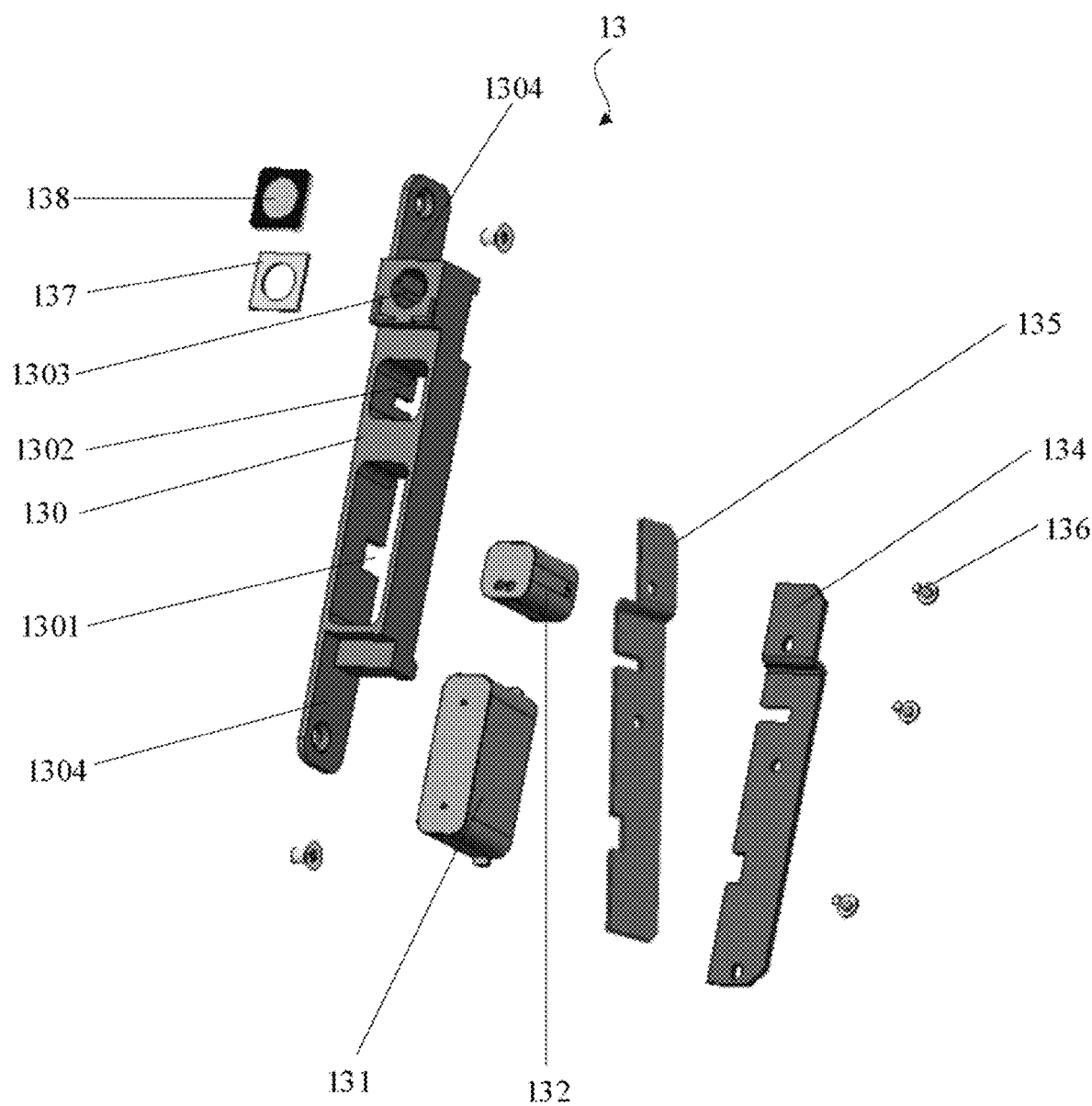
FIG. 4A is a second schematic diagram of a structure of an interaction assembly according to an embodiment of the present disclosure.

In one possible implementation, as shown in conjunction with FIGS. 3B and 4A, the interactive assembly 13 further includes a protective cover plate 134 located on a side of the assembly support frame 130 facing away from the display face 101, and a buffer double-sided thermal conductive adhesive 135 located between the assembly support frame 130 and the protective cover plate 134, herein the protective cover plate 134 and the buffer double-sided thermal conductive adhesive 135 are fixed to the assembly support frame 130 by an assembly component 136; specifically, the assembly component 136 may be, for example, a screw, and accordingly, the protective cover plate 134 and the buffer double-sided thermal conductive adhesive 135 may be provided with corresponding screw holes so that the screw passes through the screw holes, achieving that the protective cover plate 134 and the buffer double-sided thermal conductive adhesive 135 are fixed to the assembly support frame 130.

In one possible implementation, as shown in conjunction with FIGS. 3B and 4A, the interactive assembly 13 further includes a first photographing cover plate 138 covering a photographing surface of the first photographing component 133, and a first photographing double-sided buffer adhesive 137 located between the first photographing component 133 and the first photographing cover plate 138, herein the first photographing double-sided buffer adhesive 137 has a hollow in a region corresponding to the first photographing component 133 to avoid shielding light. In an embodiment of the present disclosure, the interactive assembly 13 further includes a first photographing cover plate 138 covering the photographing surface of the first photographing component 133, and a first photographing double-sided buffer adhesive 137 located between the first photographing component 133 and the first photographing cover plate 138, which may protect the first photographing component 133.

Figure 4B:
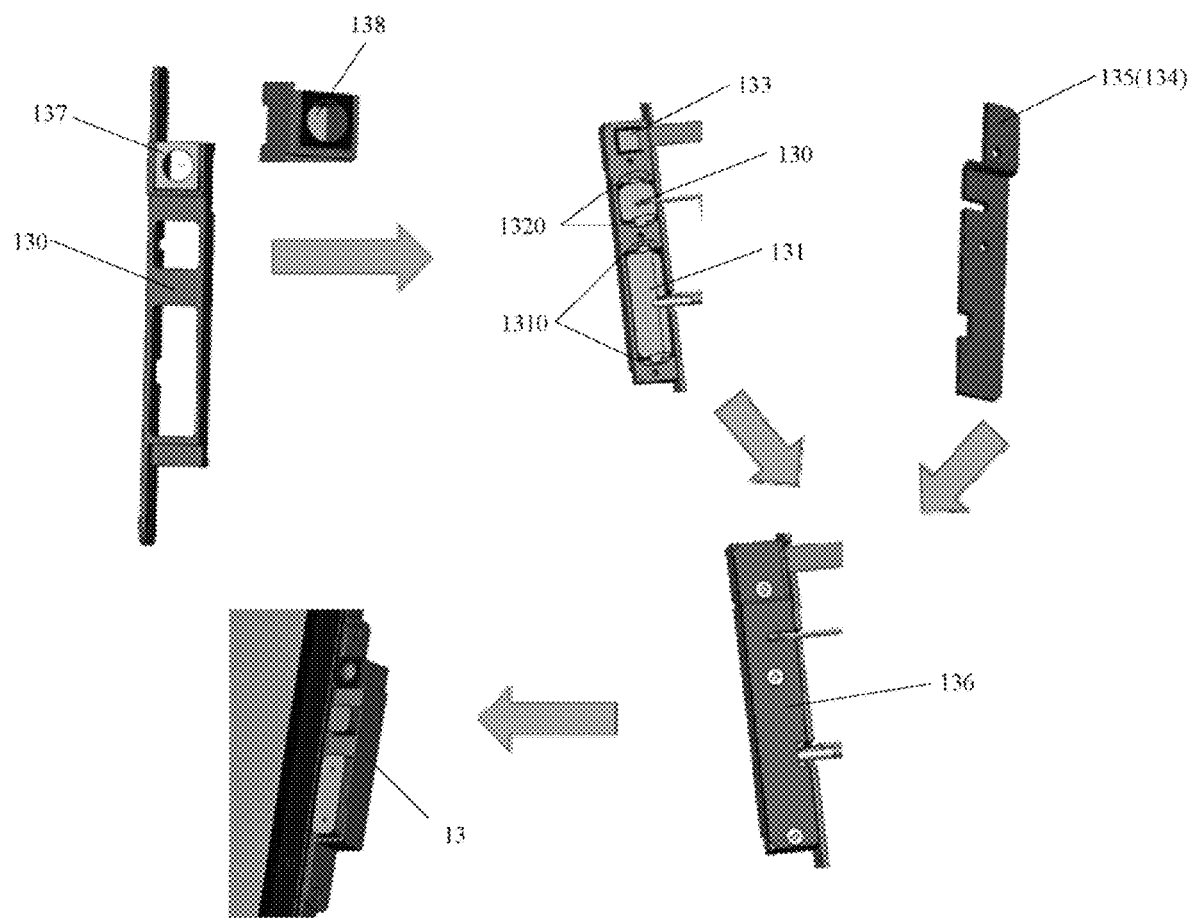
FIG. 4B is a schematic diagram of a structure of an assembly flow of an interaction assembly according to an embodiment of the present disclosure.

In order to more clearly understand a mutual relationship of the various components of the interactive assembly 13 provided by an embodiment of the present disclosure, a manner of assembling the interactive assembly 13 will be described below with reference to FIG. 4B.

a) The first photographing cover plate 138 is fixed to the assembly support frame 130 with the first photographing double-sided buffer adhesive 137;

b) The first photographing component 133, the photoelectric sensing component 132, and the microphone component 131 are sequentially placed in the assembly support frame 130;

c) The photoelectric sensing component 132 has two first lugs 1320 on a side away from the display surface 101, and the microphone component 131 has two second lugs 1310 on a side away from the display surface 101; the assembly support frame 130 has a plurality of first grooves on a side away from the display surface 101, and a plurality of second grooves on a side away from the display surface 101, and the first lugs 1320 are embedded in the first grooves one by one to limit the photoelectric sensing component 132; the second lugs 1310 are embedded in the second grooves one by one to restrict the movement towards a forward direction;

d) The protective cover plate 134 (which may specifically be a metal cover plate) is pasted with buffer double-sided thermal conductive adhesive 135, the thickness of which is selected as 0.8 mm, and the thicker buffer double-sided thermal conductive adhesive 135 may play a buffering role at the same time; the selection of thermal conductive adhesive may effectively lead out the working thermal of various electronic components, and at the same time, the application environment of the whole machine may be rotated and placed at the door of containers and freezers, which is often impacted in non-static use scenes, so the buffer design of electronic components needs to be fully considered;

e) The protective cover plate 134 is fixed with three screws to ensure that the positions of the three components in all direction are defined; and f) The interactive assembly 13 is fixed to the display screen 10 with two screws.

In one possible implementation, as shown in FIGS. 6, 7, 8A and 8B, the display device further includes at least one second photographing component 16 arranged on a back surface 102 of the display screen 10, and a first sensor 17, herein the first sensor 17 is configured to detect an angle of the door opening of the display screen 10 with respect to the container 2 in real time; specifically, when there are a plurality of second photographing components 16, the plurality of second photographing components 16 may be arranged in a column, for example, the number of the second photographing components 16 may be three, which are arranged on the upper, middle and lower sides of the back surface 102 of the display screen 10, respectively, so as to photograph different positions in the container 2; the second photographing component 16 is configured to photograph the goods in the container 2 upon receiving the photographing instruction; the processing component 12 is further configured to acquire the angle of the door opening of the first sensor 17 and send a photographing instruction to the second photographing component 17 when the angle of the door opening is determined to be the first angle. Specifically, the first sensor 17 may be arranged at the center of the back surface 102 of the display screen 10. In an embodiment of the present disclosure, by providing a second photographing component 16 (rear camera) which may photograph the goods in the container 2, the scene inside the container 2 or the internal state of the container 2 may be monitored in real time, and the workers may supplement goods in time; when the light inside the container door is too dim during a door closed period, the situation of the inside goods cannot be clearly seen by photograph, therefore by providing a first sensor 17 (an angle sensor) which may detect the angle of the door opening of the display screen 10 with respect to the container 2 in real time, when the light enters during a door opening period, the second photographing component 16 is activated to photograph, so that the problems that the light is too dim and the captured image is unclear may be avoided.

Figure 7:
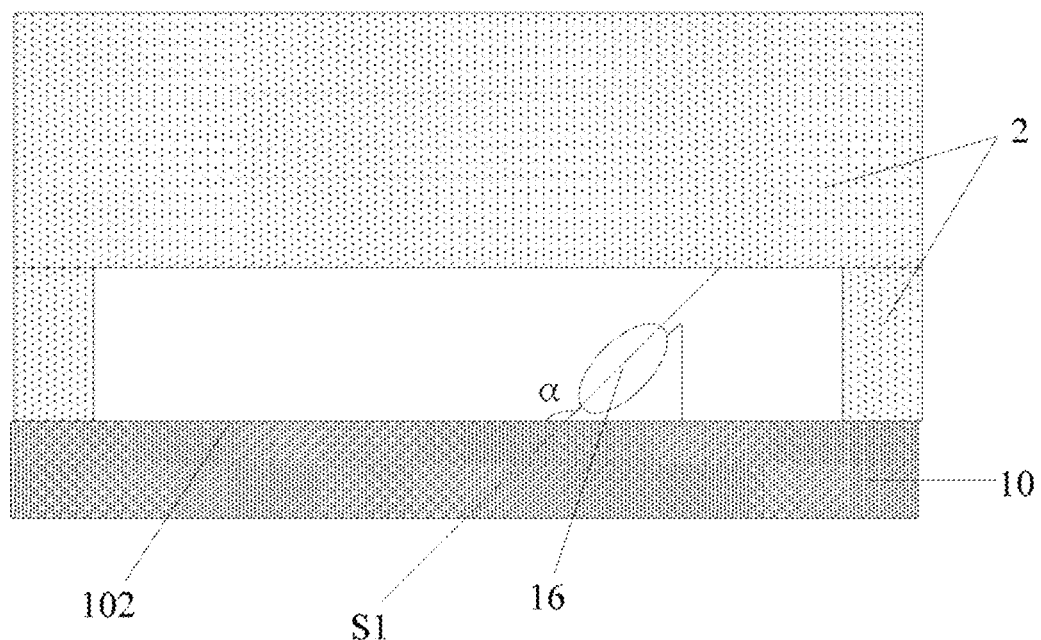
FIG. 7 is a first schematic diagram of an arrangement position of a second photographing component according to the embodiment of the present disclosure.
Figure 8A:
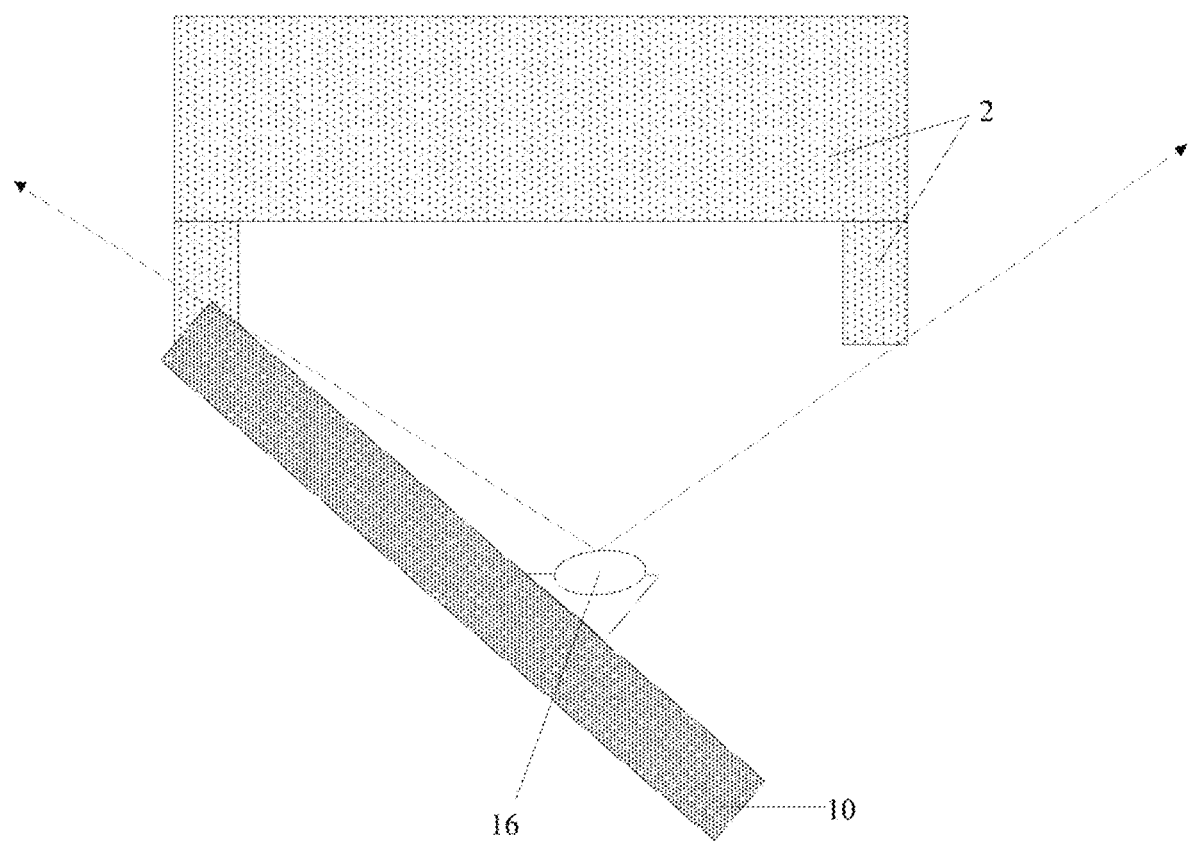
FIG. 8A is a second schematic diagram of an arrangement position of a second photographing component according to the embodiment of the present disclosure.
Figure 8B:
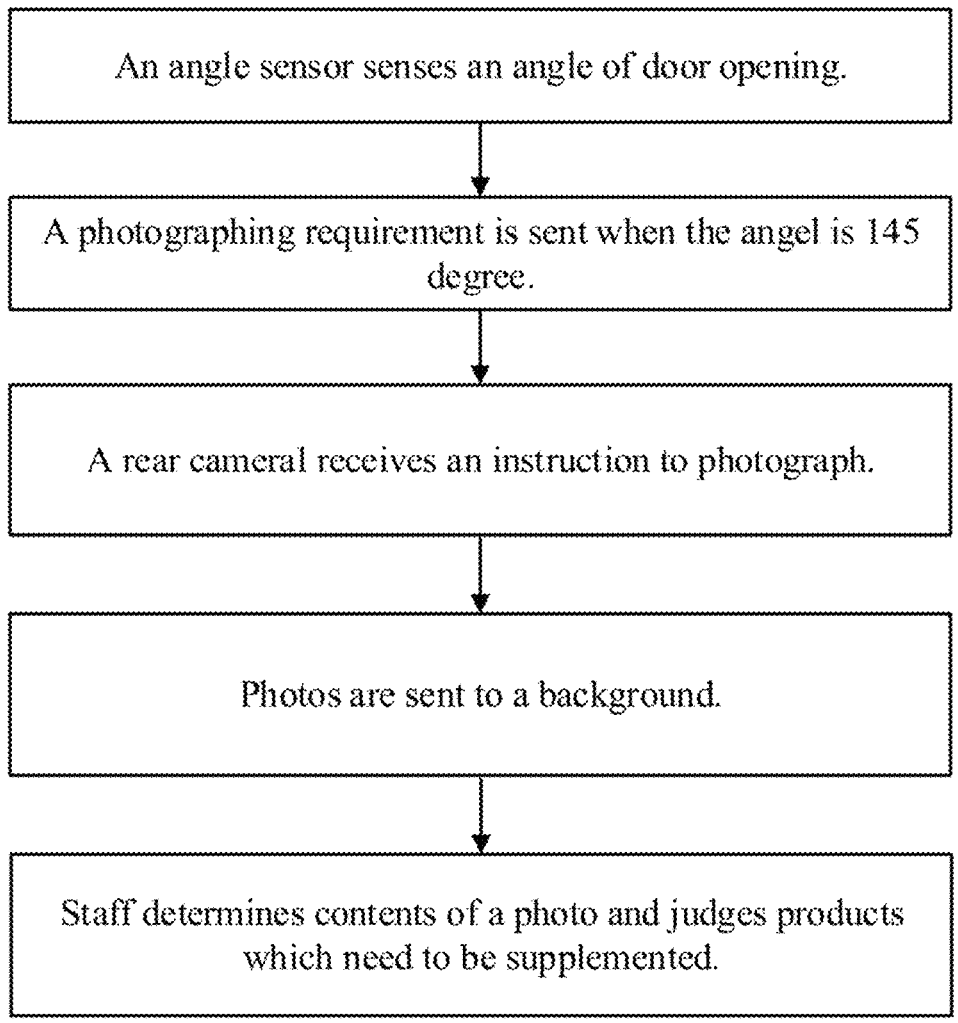
FIG. 8B is a schematic diagram of a photographing flow of a second photographing component according to the embodiment of the present disclosure.

In one possible implementation, as shown in conjunction with FIG. 7 and FIG. 8A, an included angle α between a photographing surface S1 and the back surface 102 of the second photographing component 16 is 130°~150°. Specifically, the included angle α may be 145°, and thus, when the door is opened, the photographing surface S1 is facing the inside of the container 2, and the photographing may cover the whole container 2, thus having a better photographing effect. The photographing surface S1 of the second photographing component 16 may be specifically understood as a front surface of the second photographing component 16 in which light from the photographing object enter.

Figure 6:
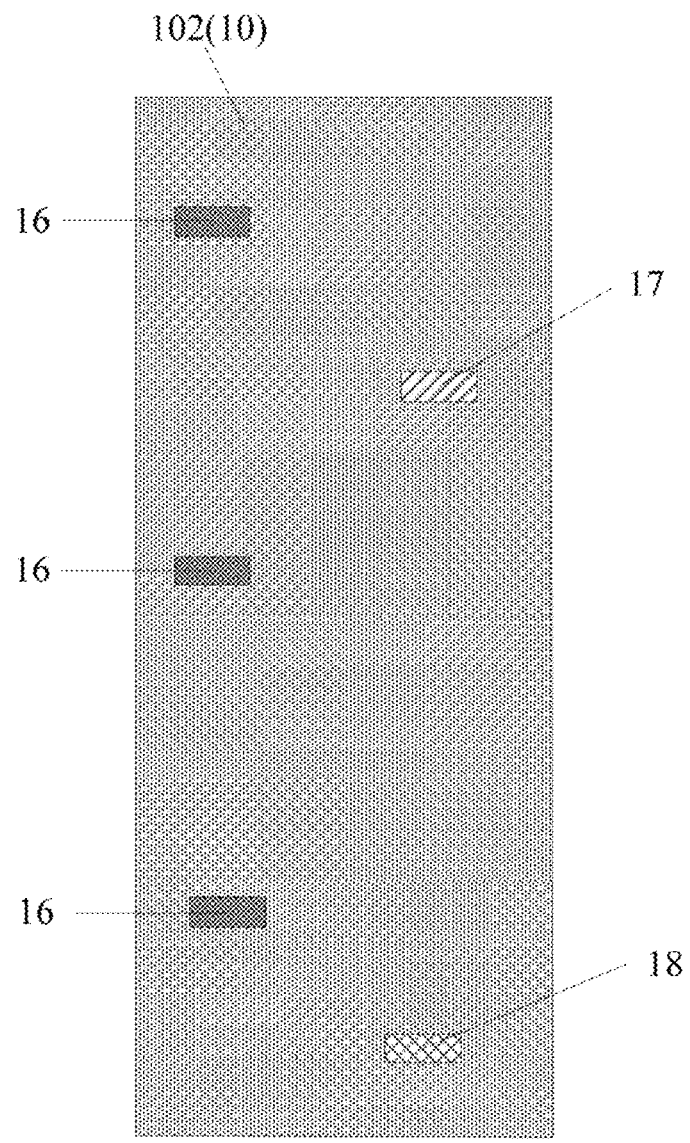
FIG. 6 a schematic diagram of a back structure of an interaction assembly according to an embodiment of the disclosure.

In one possible implementation, as shown in FIG. 6, the display device further includes a second sensor 18 arranged on the back surface 102, which is configured to monitor a temperature and/or a humidity inside the container 2 in real time to monitor whether there is abnormal air leakage, water leakage or the like, which puts the whole machine in an extreme environment and affects performance.

Figure 9:
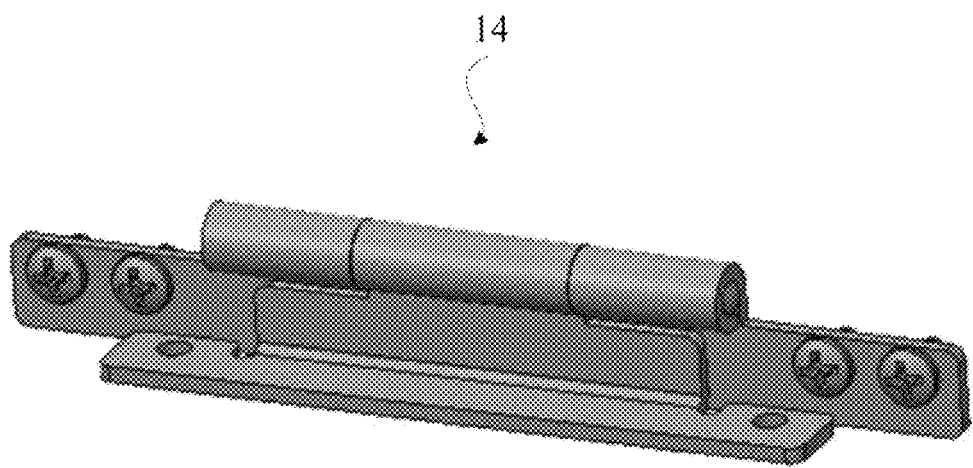
FIG. 9 is a schematic diagram of a fixation component according to an embodiment of the present disclosure.

In one possible implementation, shown in conjunction with FIGS. 1 and 2, a fixation component 14 is further included, which pivotally fixes the display device to the container 2. Specifically, as shown in conjunction with FIG. 9, the fixation component 14 may be a rotating shaft. Specifically, a plurality of fixation components 14 may be included, for example, three fixation components 14 may be provided, and the display screen 10 may be used as a container door by providing rotary shafts at upper, middle and lower positions on the left side of the display screen 10. The display screen 10 is fixed to a door frame of the container 2 through a rotating shaft, and force is applied outward from the other side of the rotating shaft, as shown in FIG. 2, so as to open the container 2 and pick up articles, thus achieving that the container has a display screen.

In one possible implementation, the depth photographing component 11, the fixing component 14, the interactive component 13, and the processing component 12 may be respectively arranged on different sides of the display screen 10; specifically, for example, the display screen 10 is rectangular, and the depth photographing component 11 may be arranged on the upper side of the display screen 10 to have a better photographing angle; the fixation component 14 may be arranged on the left side of the display screen 10 to fix the display screen 10 and the container 2; and the interactive component 13 may be arranged on the right side of the display screen 10 to facilitate making the container door open at the same time after recognizing the human motion for a convenience operation; and the processing component 12 may be arranged on the lower side of the display screen 10, which may facilitate thermal dissipation and improves goods reliability. The power supply 15 may be provided on the same side as the processing component 12. Specifically, the power supply 15 and the processing component 12 may be arranged on the lower side of the display screen 10, considering that the overall thickness of the high-power electrical elements and interfaces (e.g. USB, HDMI) is larger, so that the thickness of the display device is greatly reduced compared with placing the power supply 15 on the back of the display screen 10; in addition, thermal dissipation holes may be appropriately opened at the lower side to achieve thermal dissipation, and the product reliability is higher.

In one possible implementation, as shown in conjunction with FIGS. 1 and 2, a power supply 15 is further included, which may be electrically connected with all of a depth photographing component 11, a photoelectric sensing component 132, a microphone component 131, a first photographing component 133, a second photographing component 16, a first sensor 17, a second sensor 18, and a processing component 12, to supply power to the depth photographing component 11, a photoelectric sensing component 132, a microphone component 131, the first photographing component 133, the second photographing component 16, the first sensor 17, the second sensor 18, and the processing component 12.

An embodiment of the present disclosure further provides a container system, which is shown in conjunction with FIGS. 1 and 2, including a display device as provided by an embodiment of the present disclosure. Specifically, the container 2 may be included in the container system.

Figure 10:
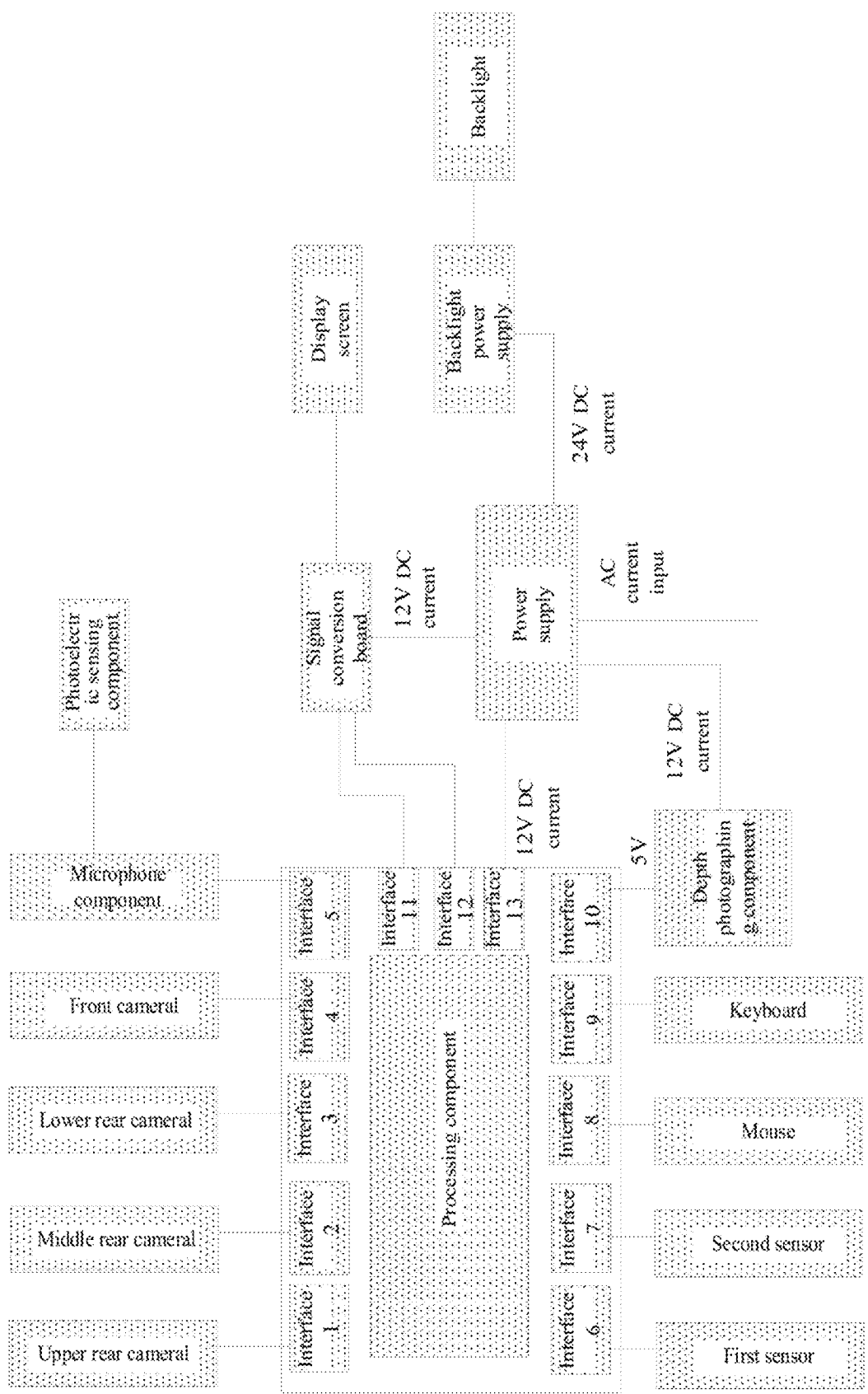
FIG. 10 is a schematic diagram of a connection of a display device according to an embodiment of the present disclosure.

A block diagram of a hardware connection of the display device provided by an embodiment of the present disclosure is illustrated below in conjunction with to FIG. 10:
  a) The AC input specification of the power supply is 90V~264V, and the DC is output to supply power to the internal structure, 12V DC is provided to the processing components, 24V DC is provided to the backlight power supply, to lighten the backlight lighting screen, provides 12V DC is provided to the signal conversion board (SOC), and 12V DC is provided to the depth photographing component;
  b) A signal conversion board inputs signals through the interface 12 (such as an HDMI interface), outputs signals to the display screen, and communicates and feeds back through the interface 11 (such as an RS232 interface);
  c) The processing component may be provided with 10 interfaces (USB interfaces), 3 rear cameras (second camera components), a front camera (a first camera component), a microphone component, a door opening and closing sensors (first sensors), a temperature and humidity sensor (a second sensor), and a depth photographing components, herein, there are 8 depth photographing components connected with USB for use, and 2 USB interfaces are reserved for debugging;
  d) The microphone component is docked with the photoelectric sensing component to achieve control and signal feedback.

Figure 11:
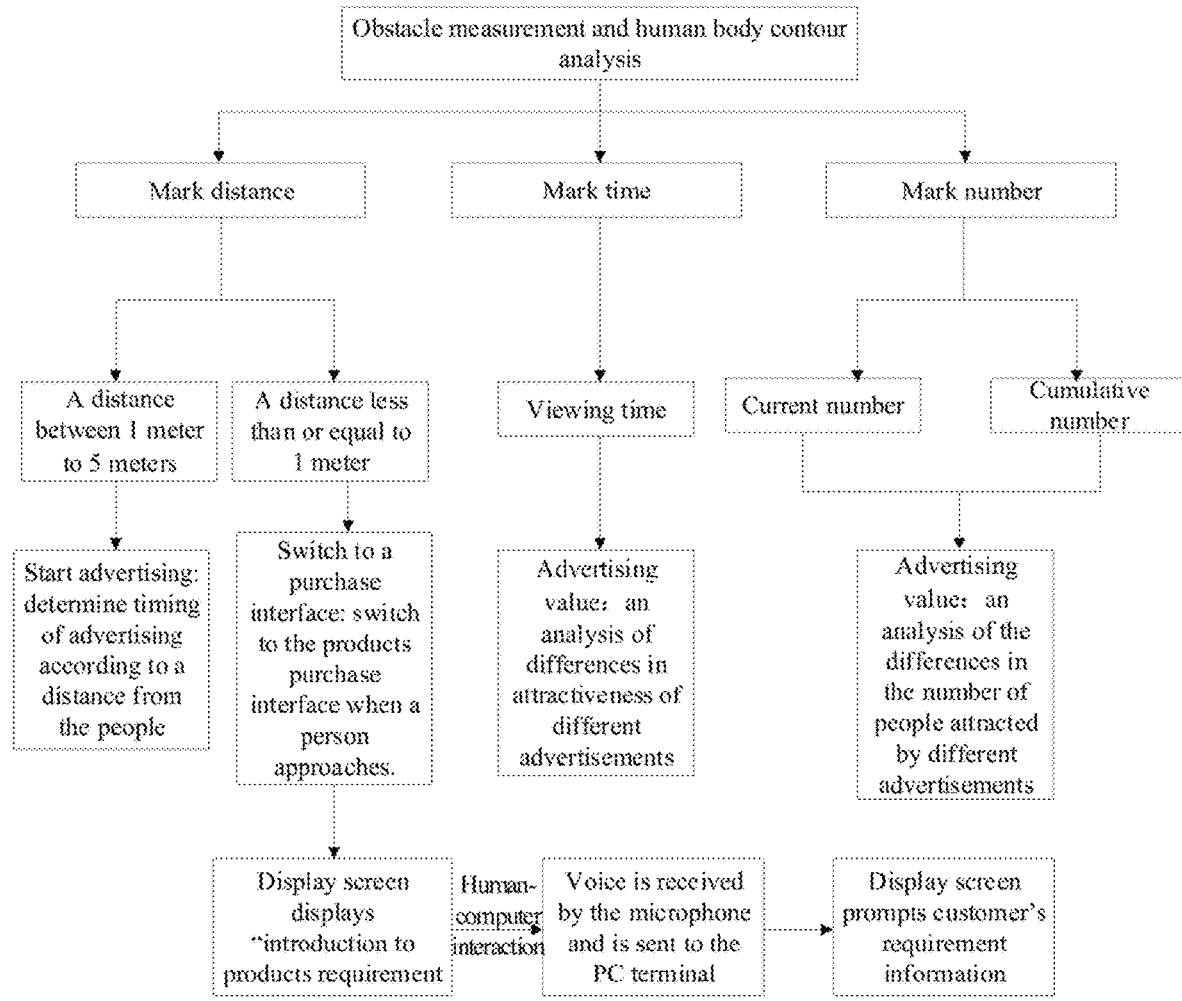
FIG. 11 is a schematic diagram of a workflow of a display device according to an embodiment of the present disclosure.

In order to more clearly understand the display apparatus provided by an embodiment of the present disclosure, further detail will be illustrated below in conjunction with FIG. 11.

In an embodiment of the present disclosure, the depth photographing component 11 analyzes the number of human body contours in the reading range, a specific distance of each person from the depth photographing component 11 and a duration of stay of each person, by reading the distance of objects in front of the display screen 10 of the whole machine; Specifically, when a specific distance between the person in the picture and the depth photographing component 11 is greater than the first distance value (for example, the first distance value may be 1 m), the display screen 10 may be controlled to play the advertisement pictures, and the number of people in a current counting range may be recorded by counting the number of human body contours in the picture acquired by the depth photographing component 11 during the corresponding advertisement picture period; the number in the current range is reduced by 1 after the human body contours move out of the counting range, and the number in the current range is increased by 1 after the human body contours move into the counting range; by counting the total number of people entering the picture, the human traffic in the advertisement placement region may be counted, and the influence after advertisement placement may be evaluated; individual timing starts when each person enters a counting region, and the timing ends when the human body leaves the counting region; by counting the above timing data which is transmitted to the processor 12, for different advertisements, the time data of attractive duration of stay may be analyzed, and the attraction of advertisement content may be evaluated, so as to analyze user preferences.

When the distance from someone in the picture acquired by the depth photographing component 11 to the display screen 10 is less than the first distance value, the display screen 10 is controlled to play a sales goods list and price introduction, and display the demand introduction guide; specifically, when a user is detected to be close to the display screen 10, the display screen 10 is controlled to switch to the goods map, and the screen will prompt the user to use the photoelectric sensing component 132 and the microphone part 131 at the edge of the whole machine to interact with the display screen 10; for example, when the display screen prompt that "which goods do you need?", the user may wave in front of the photoelectric sensing component 132, an indicator light of the photoelectric sensing component 132 is lit, and the user may say the name of the goods in front of the microphone part 131; after the microphone part 131 receives the voice information, the voice information is transmitted to the processor 12, and the display screen 10 immediately displays the introduction of this goods, which may specifically include price, ingredients, use methods, etc., with a prompt content displayed at the same time: "Do you want to evaluate this goods or return to the previous level?" The user may continue to give feedback through the photoelectric sensing component 132 and the microphone section 131.

Figure 12:
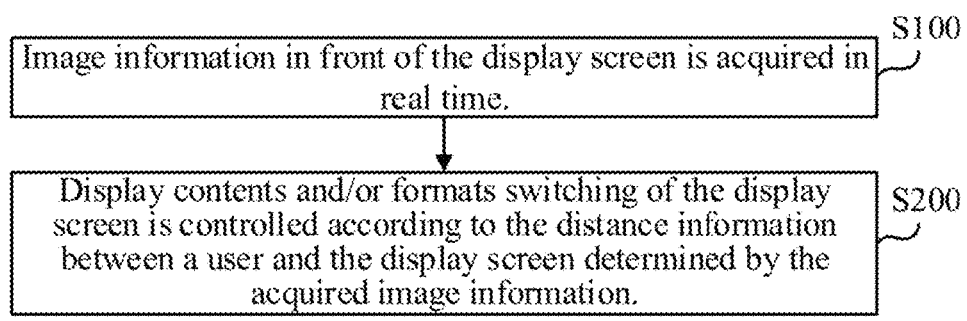
FIG. 12 is a first schematic diagram of a control method for a display device according to an embodiment of the present disclosure.

An embodiment of the disclosure further provides a control method for the display device as provided by an embodiment of the disclosure, which is shown in FIG. 12, including:

- at S100, acquiring image information in front of the display screen in real time; and
- at step S200, control display contents and/or formats switching of the display screen according to distance information between a user and the display screen determined by the acquired image information.

Figure 13:
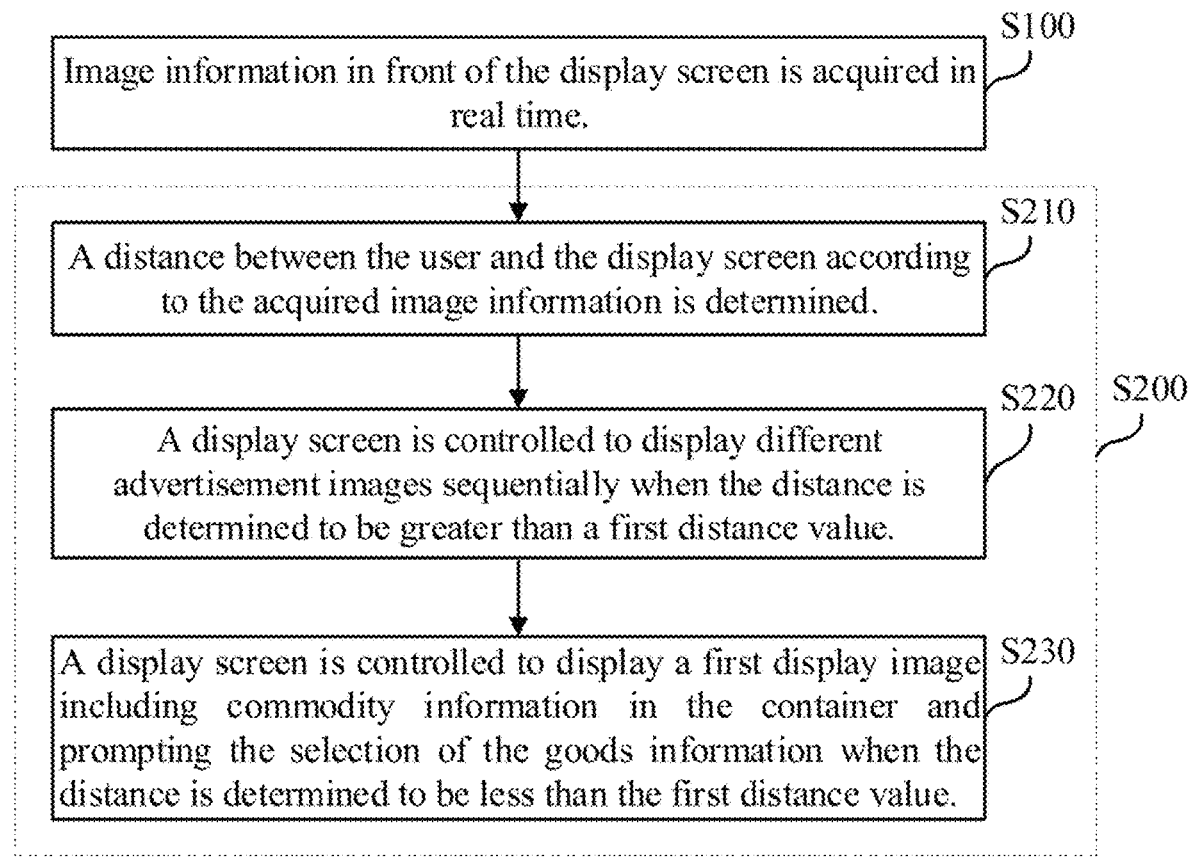
FIG. 13 is a second schematic diagram of a control method for a display device according to an embodiment of the present disclosure.

In one possible implementation, referring to FIG. 13, with respect to step S200, the control for the display contents and/or formats switching of the display screen according to the acquired image information includes:

- at step S210, a distance between the user and the display screen is determined according to the acquired image information;
- at S220, the display screen is controlled to display different advertisement images sequentially when the distance is determined to be greater than a first distance value, specifically, the first distance value may be adjusted to correspond to sizes of different shopping malls or supermarkets to be suitable for different application scenarios; and
- at Step S230, the display screen is controlled to display a first display image including commodity information in the container and prompting the selection of the goods information when the distance is determined to be less than the first distance value.

In one possible implementation, after step S230, that is, after the display screen is controlled to display a first display image including the commodity information in the container and prompting selection of the goods information when it is determined that the distance is less than the first distance value, the control method may further include: human body action information is sensed in real time; voice information of the user is acquired when it is determined that the human body action information is acquired; and the display screen is controlled according to the voice information to display a second display image including a goods information introduction corresponding to the voice information.

Figure 14:
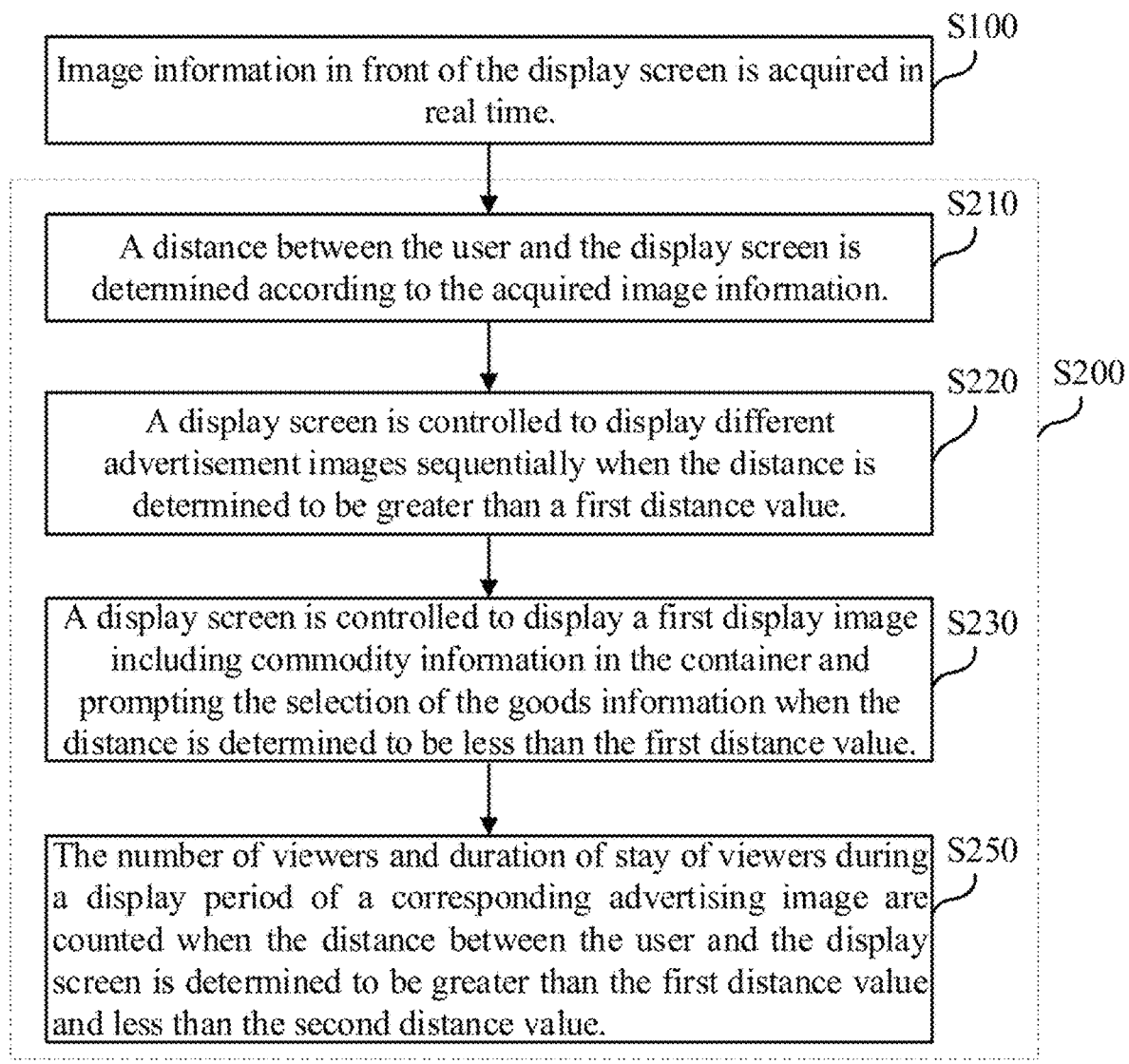
FIG. 14 is a third schematic diagram of a control method for a display device according to an embodiment of the present disclosure.

In one possible implementation, referring to FIG. 14, with respect to step S200, the control for the display contents and/or formats switching of the display screen according to the acquired image information may further include:

- at Step S250, counting the number of viewers and duration of stay during a display period of a corresponding advertising image when the distance between the user and the display screen is determined to be greater than the first distance value and less than the second distance value.

Specifically, with respect to step S250, counting the number of viewers and the duration of stay in a display period of a corresponding advertisement image may include:

- at Step S251, reading the number of human body contours in a range of a distance from the display screen which is larger than the first distance value and smaller than the second distance value before the display period of the current advertisement image;
- at Step S252, increasing the number of human body contours by one when the human body contour is determined to be moved into a range of the second distance value during a display period of the current advertisement image; and
- at Step S253, reducing the number of human body contours by one when the human body contour is determined to be moved out of a range of the second distance value during a display period of the current advertisement image.

In an embodiment of the present disclosure, the display device includes a display screen 10, a depth photographing component 11, and a processing component 12, wherein the depth photographing component may acquire image information in front of the display screen 10 in real time, the processing component 12 may control the display contents and/or formats switching of the display screen 10 according to the acquired distance information, and may make the display screen display corresponding pictures in real time according to an interaction between the user and the display screen, so as to achieve an interaction between the user and the display screen.

Apparently, various modifications and variations to the present disclosure may be made by those skilled in the art without departing from the spirit and scope of the present disclosure. Thus, if these modifications and variations to the present disclosure fall within the scope of the claims of the present disclosure and their equivalent techniques, the present disclosure is intended to include these modifications and variations.

The invention claimed is:

1. A display device, comprising:
   a display screen, comprising a display surface and a back surface opposite to the display surface;
   a depth photographing component, configured to acquire image information in front of the display screen in real time, wherein the image information contains distance information between a user and the display screen; and
   a processing component, electrically connected to the depth photographing component and configured to control display contents and/or formats switching of the display screen according to the distance information between the user and the display screen determined by the acquired image information, wherein:
   the display device further comprises a microphone component and a photoelectric sensing component;
   the photoelectric sensing component is a sensing control switch of the microphone component, the microphone component is turned on through a gesture sensed by the photoelectric sensing component, the photoelectric sensing component and the microphone component are assembled integrally at a close distance;
   the display device further comprises a first photographing component, configured to acquire user image information in real time;
   the display device further comprises an assembly support frame fixed on a side of the display screen;
   an extension direction of a main body of the assembly support frame is the same as an extension direction of a side edge fixed on the display screen, and the assembly support frame comprises a first through groove, a second through groove and a third through groove arranged sequentially along the extension direction of the main body of the assembly support frame;
   the first photographing component is embedded in the first through groove to be fixed with the display screen; the photoelectric sensing component is embedded in the second through groove to be fixed with the display screen; and the microphone component is embedded in the third through groove to be fixed with the display screen; and the processing component is disposed at a lower side of the display screen, a power supply is disposed at a same side as the processing component, the power supply and the processing component are disposed at the lower side of the display screen.

2. The display device according to claim 1, wherein the processing component is configured to:

control the display screen to display different advertisement images sequentially when a distance between the user and the display screen is determined to be greater than a first distance value; and control the display screen to display a first display image including commodity information in a container and prompting selection of goods information when the distance between user and the display screen is determined to be less than the first distance value.

3. The display device according to claim 2, wherein the photoelectric sensing component is configured to sense human body action information in real time;

the microphone component is configured to receive voice information of the user when receiving a first instruction; and the processing component is further configured to, when the human body action information sensed by the photoelectric sensing component is acquired, send the first instruction to the microphone component, acquire voice information of the microphone component, and control the display screen to display a second display image including an goods information introduction corresponding to the voice information.

4. The display device according to claim 2, wherein the processing component is further configured to count a quantity of viewers and a duration of stay of the viewers during a display period of a corresponding advertising image when the distance between the user and the display screen is determined to be greater than the first distance value and less than the second distance value.

5. The display device according to claim 4, wherein the processing component is configured to:

read the quantity of human body contours in a range of a distance from the display screen which is larger than the first distance value and smaller than the second distance value before the display period of the current advertisement image;

increase the quantity of human body contours by one when a human body contour is determined to be moved into a range of the second distance value during the display period of the current advertisement image; and reduce the quantity of human body contours by one when a human body contour is determined to be moved out of the range of the second distance value during the display period of the current advertisement image.

6. The display device according to claim 1, wherein the photoelectric sensing component comprises a plurality of first lugs on a side away from the display surface, and the microphone component comprises a plurality of second lugs on a side away from the display surface;

the assembly support frame comprises a plurality of first grooves on a side away from the display surface, the assembly support frame comprises a plurality of second grooves on the side away from the display surface, and the first lugs are embedded in the first grooves one by one to limit the photoelectric sensing component; and the second lugs are embedded in the second grooves one by one to limit the microphone component.

7. The display device according to claim 6, further comprising a protective cover plate located on a side of the assembly support frame away from the display surface, and a buffer double-sided thermal conductive adhesive located between the assembly support frame and the protective cover plate, wherein the protective cover plate and the buffer double-sided thermal conductive adhesive are fixed to the assembly support frame through an assembly component.

8. The display device according to claim 6, further comprising a first photographing cover plate covering a photographing surface of the first photographing component, and a first photographing double-sided buffer adhesive located between the first photographing component and the first photographing cover plate, wherein the first photographing double-sided buffer adhesive comprises a hollow in a region corresponding to the first photographing component.

9. The display device according to claim 1, wherein:

the display screen is used for being arranged on a door body or directly acting as the door body; the display device comprises at least one second photographing component arranged on the back surface and a first sensor;

the first sensor is configured to detect an opening angle of the display screen relative to the door body of the container in real time;

the second photographing component is configured to photograph goods in the container when a photographing instruction is received; and the processing component is further configured to acquire an opening angle of a door body of the first sensor, and send the photographing instruction to the second photographing component when the opening angle of the door body is determined to be a first angle.

10. The display device according to claim 9, wherein an included angle between a photographing surface of the second photographing component and the back surface is 130°~150°.

11. The display device according to claim 9, further comprising a second sensor arranged on the back surface, wherein the second sensor is configured to monitor a temperature and/or a humidity in the container in real time.

12. The display device according to claim 11, further comprising a fixation component configured to pivotally fix the display device to the container.

13. A container system, comprising a display device, wherein the display device comprises:

a display screen, comprising a display surface and a back surface opposite to the display surface;

a depth photographing component, configured to acquire image information in front of the display screen in real time, wherein the image information contains distance information between a user and the display screen; and a processing component, electrically connected to the depth photographing component and configured to control display contents and/or formats switching of the display screen according to the distance information between the user and the display screen determined by the acquired image information, wherein:

the display device further comprises a microphone component and a photoelectric sensing component;

the photoelectric sensing component is a sensing control switch of the microphone component;

the microphone component is turned on through a gesture sensed by the photoelectric sensing component, the photoelectric sensing component and the microphone component are assembled integrally at a close distance;
the photoelectric sensing component is configured to sense human body action information in real time;
the microphone component is configured to receive voice information of the user when receiving a first instruction;
the display device further comprises a first photographing component, configured to acquire user image information in real time;
the display device further comprises an assembly support frame fixed on a side of the display screen;
an extension direction of a main body of the assembly support frame is the same as an extension direction of a side edge fixed on the display screen, and the assembly support frame comprises a first through groove, a second through groove and a third through groove arranged sequentially along the extension direction of the main body of the assembly support frame;
the first photographing component is embedded in the first through groove to be fixed with the display screen; the photoelectric sensing component is embedded in the second through groove to be fixed with the display screen; and the microphone component is embedded in the third through groove to be fixed with the display screen;
the processing component is disposed at a lower side of the display screen, a power supply is disposed at a same side as the processing component, the power supply and the processing component are disposed at the lower side of the display screen; and
the power supply is electrically connected with the depth photographing component, the photoelectric sensing component, the microphone component, the first photographing component and the processing component, and the power supply is configured to supply power to the depth photographing component, the photoelectric sensing component, the microphone component, the first photographing component and the processing component.

14. A control method for a display device, wherein the display device comprises:
a display screen, comprising a display surface and a back surface opposite to the display surface;
a depth photographing component, configured to acquire image information in front of the display screen in real time, wherein the image information contains distance information between a user and the display screen; and
a processing component, electrically connected to the depth photographing component and configured to control display contents and/or formats switching of the display screen according to the distance information between the user and the display screen determined by the acquired image information, wherein:
the display device further comprises a microphone component and a photoelectric sensing component;
the photoelectric sensing component is a sensing control switch of the microphone component;
the microphone component is turned on through a gesture sensed by the photoelectric sensing component, the photoelectric sensing component and the microphone component are assembled integrally at a close distance;
the photoelectric sensing component is configured to sense human body action information in real time;
the microphone component is configured to receive voice information of the user when receiving a first instruction;
the display device further comprises a first photographing component, configured to acquire user image information in real time;
the display device further comprises an assembly support frame fixed on a side of the display screen;
an extension direction of a main body of the assembly support frame is the same as an extension direction of a side edge fixed on the display screen, and the assembly support frame comprises a first through groove, a second through groove and a third through groove arranged sequentially along the extension direction of the main body of the assembly support frame;
the first photographing component is embedded in the first through groove to be fixed with the display screen; the photoelectric sensing component is embedded in the second through groove to be fixed with the display screen; and the microphone component is embedded in the third through groove to be fixed with the display screen;
the processing component is disposed at a lower side of the display screen, a power supply is disposed at a same side as the processing component, the power supply and the processing component are disposed at the lower side of the display screen; and
the power supply is electrically connected with the depth photographing component, the photoelectric sensing component, the microphone component, the first photographing component and the processing component, and the power supply is configured to supply power to the depth photographing component, the photoelectric sensing component, the microphone component, the first photographing component and the processing component,
wherein the method comprises:
acquiring, by the depth photographing component, image information in front of the display screen in real time; and
controlling, by the processing component, display contents and/or formats switching of the display screen according to the distance information between the user and the display screen determined by the acquired image information,
wherein controlling, by the processing component, the display contents and/or formats switching of the display screen according to the distance information between the user and the display screen determined by the acquired image information, comprises:
determining, by the processing component, a distance between the user and the display screen according to the acquired image information;
controlling, by the processing component, the display screen to display different advertisement images sequentially when the distance is determined to be greater than a first distance value; and
controlling, by the processing component, the display screen to display a first display image comprising commodity information in a container and prompting selection of goods information when the distance is determined to be less than the first distance value,
wherein after controlling, by the processing component, the display screen to display the first display image comprising the commodity information in the container and prompting selection of the goods information, the control method further comprises:
sensing, by photoelectric sensing component, human body action information in real time;

acquiring, by the microphone component, a voice information of the user when it is determined that the human body action information is acquired; and controlling, by the processing component, according to the voice information, the display screen to display a second display image comprising a goods information introduction corresponding to the voice information.

15. The control method according to claim 14, wherein controlling the display contents and/or formats switching of the display screen according to the distance information between the user and the display screen determined by the acquired image information further comprises:

counting a quantity of viewers and duration of stay of viewers during a display period of a corresponding advertising image when the distance between the user and the display screen is determined to be greater than the first distance value and less than the second distance value.

16. The control method according to claim 15, wherein counting the quantity of viewers and the duration of stay of viewers during the display period of the corresponding advertising image comprises:

reading a quantity of human body contours in a range of a distance from the display screen which is larger than the first distance value and smaller than the second distance value before the display period of the current advertisement image;

increasing the quantity of human body contours by one when a human body contour is determined to be moved into a range of the second distance value during the display period of a current advertisement image; and reducing the quantity of human body contours by one when a human body contour is determined to be moved out of the range of the second distance value during the display period of the current advertisement image.

* * * * *